Patented Nov. 13, 1923.

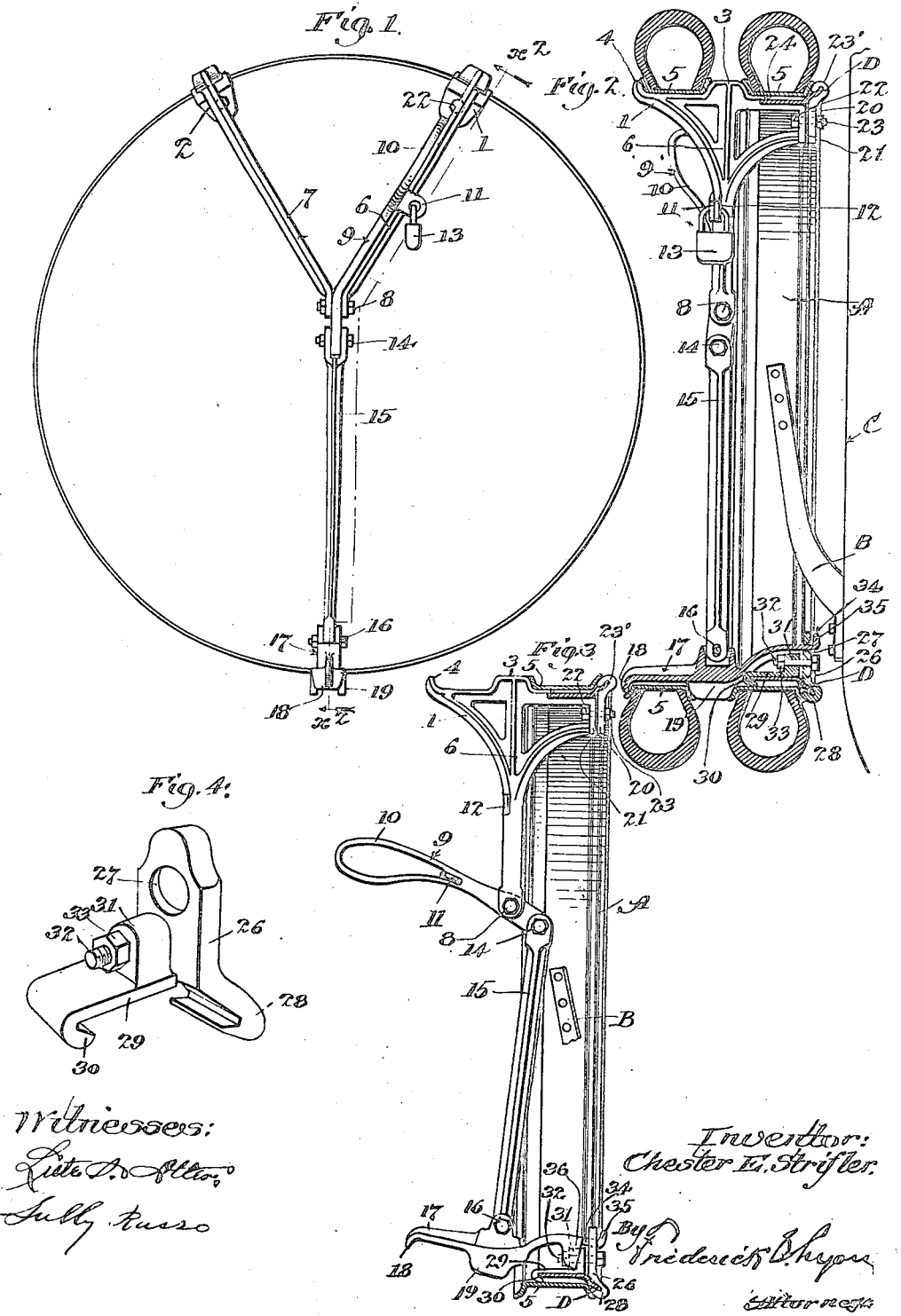

1,473,943

UNITED STATES PATENT OFFICE.

CHESTER E. STRIFLER, OF ALHAMBRA, CALIFORNIA, ASSIGNOR OF ONE-HALF TO S. Q. SHANNON, OF LOS ANGELES, CALIFORNIA.

TIRE-HOLDING DEVICE.

Application filed October 9, 1916. Serial No. 124,689.

*To all whom it may concern:*

Be it known that I, CHESTER E. STRIFLER, a citizen of the United States, residing at Alhambra, in the county of Los Angeles and State of California, have invented a new and useful Tire-Holding Device, of which the following is a specification.

A great many of the late automobiles have a felloe band secured upon the rear or side thereof so as to provide means for supporting and holding a demountable rim having an extra tire thereon, the rim being secured upon the felloe band as is ordinarily done when the band is carried by a wheel. This method of carrying a single extra tire is very successful but in order to carry two tires it is necessary to use brackets of some form together with straps to hold the tires in place. The foregoing manner of securing an extra tire to the one carried by the felloe band has numerous disadvantages in that the tire can be removed and stolen and will not be held sufficiently rigid to prevent chafing and other injury thereto.

My invention relates to a tire holding device which is in the form of an attachment for cooperation with the felloe band or present universally used holder for a single tire.

It is the primary object of my invention to provide a tire holder which may be easily and quickly attached to the present well-known style of felloe band tire holder without the employment of special bolts or the requirement of any change in the construction of the felloe band holder, the result being that tire and rim may be safely supported alongside the tire and rim on the felloe band so that the chafing of either tire is prevented, possibility of loss of either tire through theft is eliminated, and the troublesome unbuckling of straps or the removal of nuts is done away with.

A further object is to provide a holder of the character described which when attached to the ordinary felloe band tire holder will eliminate the necessity of employing bolts and nuts for securing the tire which is to be mounted upon the felloe band as is ordinarily done where a felloe band holder is used alone.

A still further object of this invention is to provide novel, simple, easily operable and reliable fastening means for removably securing the holder to the felloe band that is attached to the automobile.

The accompanying drawings illustrate the invention:

Figure 1 is a front elevation of the device as it will appear when in locked position and without tires thereon;

Fig. 2 is a vertical sectional view taken on line 2—2 of Fig. 1, showing the device as it would appear when in use and locked with tires thereon, a fragmentary portion of the automobile to which the felloe band is attached being shown.

Fig. 3 is a view similar to Fig. 2, showing the device in unlocked position and the tires removed; and Fig. 4 is an enlarged detail perspective view of the means for fastening the lower end of the holder to the felloe band holder.

Referring to the drawings, A designates a felloe band of standard construction which is secured by suitable arms B to the rear of the vehicle C preferably, and upon its inner edge is formed with an angularly disposed longitudinally grooved flange D. In this connection it is to be understood that in some instances the felloe bands are flat in cross section and not provided with a flange such as the one D shown herein. Ordinarily a tire supported by the band A has its rim secured upon the band in the same manner in which it would be secured upon the band were the latter a part of a wheel.

My holder attachment comprises brackets 1 and 2, each of which is formed intermediate its ends with a transverse partition rib 3. Upon its outer end each bracket is provided with an upwardly extending rim retaining flange 4, the space between the rib 3 and flange 4 on each bracket being equal to the width of the demountable rim 5. Extending downwardly and inwardly from the brackets 1 and 2 are convergent arms 6 and 7 which are secured to one another by fastening means 8 at their lower ends, said fastening means passing through and acting as a pivot for a locking lever 9. The lever 9 is bent to lie parallel with the arm 6 and is provided with a hand-grip portion 10 on its free end. An ear 11 is formed on the lever 9 and cooperates with an ear 12 formed on the arm 6 so that when said ears are in registration a padlock 13 or other suitable locking means may be inserted therethrough to hold the lever in position and lock the tires in place. The lower end of the lever is located below the fastening means 8 and the lower ends of the arms 6 and 7 and is pivotally secured as at 14 in the forked upper end of a link arm 15. The link arm at its lower end has a pin and slot connection 16 with the upper side of a tire clamping member 17. The clamp is constructed similarly to the brackets 1 and 2, it being provided upon its outer end with a rim engaging flange 18 and intermediate its ends with a transverse partition rib 19 which is adapted to engage the rims of the inner and outer tires to hold the tires against removal.

I provide a novel means for removably securing the brackets 1 and 2 to the felloe band A and this means comprises a securing plate 20 which is removably secured to the inner end of each bracket, said inner ends being provided with a depending flange 21, by a bolt 22 which has a nut 23 turned upon its outer end and passes through the flange 21 and securing plates 20. The upper end of the securing plate is made into hook form as at 23' so as to receive the flange D of the felloe band A, and it will be noted that the brackets 1 and 2 are each undercut adjacent to their inner ends as at 24 so as to receive the adjacent edge of the felloe band. It will be seen that it is only necessary to place the hook ends 23' of the securing plates 20 over and in engagement with the inner edge of the felloe band and to tighten the nuts 23 on the bolt 22 in order to secure the brackets to the band.

The means for securing the clamp 17 comprises an angular plate 26 similar to the plate 20 but provided at its upper end with a relatively large opening 27 and at its lower end with an offset hook portion 28, the latter being adapted to engage and receive the flange D of the felloe band A as does the hook portion 23' of the securing plate 20. Cooperating with the hook portion 28 is a flat clamping plate 29 having its outer end formed with a depending felloe engaging flange 30. An upstanding ear 31 is formed on the inner end of the plate 29 and is apertured to receive a bolt 32 which passes through the plate 26 below the opening 27 and has a nut 33 turned thereon, said nut engaging the outer face of the ear 31. These plates 26 and 29 are secured upon the felloe band at a point below the brackets 1 and 2, the opposed edges of the band being engaged and clamped by the flange 30 and end 28 of said plates. By tightening the nut 33 the securing of the plates may be had. The inner end of the clamping member 17 is provided with a tongue 34 having an upturned end 35, said end 35 acting to retain the tongue in position, and this provides for the hinging of the member 17 to the felloe band. Opposed depending flanges 36 are formed upon the inner end of the member 17 and engage opposite sides of the ear 31 so as to prevent lateral movement of the clamping member and provide for its movement in an even manner.

In use, the tires are placed upon the brackets 1 and 2 and the lever 9 is held in the position shown in Fig. 3. By forcing the lever upwardly the clamp 17 is forced downwardly into clamping relation to the tires as shown in Fig. 3 of the drawings. When the handle is in up position, the ear 11 registers with the ear 12 and the padlock 13 is inserted through the ears and locked. This will hold the tires securely upon the device so that there is no possibility of theft or chafing due to the rubbing together of the tires.

To remove a tire or both tires, the lock 13 is unlocked and removed from the ears 11 and 12 and the lever 9 is pushed downwardly causing the arm 15 to lift the clamping member 17 upwardly away from the tires into the position shown in Fig. 3 of the drawings. It will be seen that when the clamping member 17 is in this position the flange 18 is free from engagement with the outer tire rim so that said outer tire may be readily removed. The rib 19 is also removed from engagement with the rim of the inner tire which is mounted upon the felloe band and the inner tire may be removed by first pulling it outwardly away from the felloe band on the lower side thereof and then lifting it from the brackets 1 and 2.

I am aware of the tire holding devices in which the brackets provided for supporting the tires are permanently or otherwise attached to a bracket on the automobile or some convenient part of the automobile, and of devices in which stationary brackets and a clamping member are employed to lock the tires in position, but these devices are not adaptable for connection and cooperation with the standard equipment of late automobiles, meaning a felloe band permanently attached to the automobile for the purpose of supporting a demountable rim tire. In the prior devices no means have been provided which would enable their actual connection directly with the felloe band without requiring some change in the construction of the band or the employment of special tools. Therefore what I consider the most essential feature of my invention is the fact that I have provided a tire holder particularly designed to be secured upon the felloe band holder which comes with the automobile as part of the equipment thereof, a holder of such character that it may be attached as above described, quickly and with ease. Another essential feature of the invention is the fact that both tires can be removed easily and expeditiously by a single movement of a lever and without soiling the hands as is done where straps are employed or bolts used for securing purposes.

I claim:

1. A tire holder adapted for connection with the felloe band tire holder equipment of an automobile, comprising brackets for supporting the tire, a clamping member opposite the brackets and connected therewith, means for moving the clamping member into operative position, and means to removably secure the brackets and the clamping member to the felloe band tire holder of the automobile.

2. In a tire holder the combination with an automobile including a circular tire supporting band, of brackets for supporting a tire, a tire clamping member opposite to the brackets, and connected therewith, means to move the member into and out of position, a securing plate for each bracket and having a hook end engaging the band, means to detachably secure the plates to the brackets, and means to removably and detachably secure the clamping member to the band.

3. In a tire holder the combination with an automobile including a circular tire supporting band, of brackets for supporting a tire, a tire clamping member opposite to the brackets and connected therewith, means to move the member into and out of position, a securing plate for each bracket and having a hook end engaging the band, means to detachably secure the plates to the brackets, means to removably and detachably secure the clamping member to the band, and means to lock the clamping member in operative position.

4. In a tire holder the combination with an automobile including a circular tire supporting band permanently attached to the automobile, of tire holding brackets removably secured to the band at spaced points on one side, a tire clamping member detachably secured to the band at a point opposite the brackets, and a connection between the brackets and clamping member including means to move the clamping member into and out of operative position.

5. A tire holder adapted for connection with the felloe band tire holder equipment of an automobile comprising brackets for supporting a tire, a clamping member opposite the brackets, means for moving the clamping member into operative position, and means to secure the brackets and clamping member to the felloe band tire holder of an automobile.

6. In a tire holder, the combination with a circular tire supporting band permanently attached to an automobile, of tire holding brackets secured to the band, a tire clamping member secured to the band, and means to move the tire clamping member into and out of clamping position.

7. In a tire holder, the combination with the felloe band tire holder of an automobile which is adapted to receive and support a demountable rim having a tire thereon, of means for supporting a demountable rim with a tire thereon including tire supporting brackets, and a clamping member, both secured to the felloe band tire holder, said brackets and clamp adapted to lock the tire and rim to be supported upon the felloe band holder, against removal therefrom.

8. In a tire holder, the combination with a felloe band tire holder of an automobile adapted to support a demountable rim having a tire thereon, of brackets for supporting a demountable rim having a tire thereon, means to secure the brackets to the felloe band tire holder, a clamping member, means to secure the clamping member to the felloe band tire holder, means carried by the clamping member to engage the demountable rim of the tire to be supported upon the felloe band holder to hold the tire and rim against removal, said clamping member adapted to clamp the tire to be supported upon the brackets against removal therefrom, and means to move the clamping member into and out of clamping position.

9. A tire carrier comprising a ring on which a tire and rim is adapted to be placed, supports for an additional tire carried thereby, and a pivoted lever adapted to lock one tire on the ring and the other tire on the second supports.

10. A tire carrier attachment for use with a felloe band comprising tire supporting brackets, arms carried by said brackets and converging downward, a lever pivoted intermediate its ends to and between said arms, a link pivoted to said lever, a tire clamp carried by said link, and means for detachably securing said brackets and said tire clamp to a felloe band.

11. A tire holder comprising tire supporting brackets, arms carried by said brackets and converging downwardly, a lever pivoted to and between said arms, a link carried by said lever, a tire clamp carried by said link, a felloe band, a securing plate adapted to positively grip said felloe band, means to secure said brackets to said plate, an angular plate adapted to grip said felloe band and said last mentioned plate being provided with an opening to pivotally receive and secure said clamp.

12. In a tire holder, the combination with a felloe band, of tire supporting brackets, a tire clamp, plate members provided with hooks to grip said felloe band, means to secure said brackets to said plate members, and an angular plate member provided with a hook to grip said felloe band and with an opening to receive and pivotally secure said tire clamp.

13. A tire carrier comprising a ring on which a tire and rim are adapted to be placed, supports for an additional tire and rim carried by said ring and a pivoted clamping member adapted to bear against each of said rims to lock one tire and rim on the ring and the other on the supports.

14. A tire holder for automobiles including brackets for supporting a tire and rim, arms carried by said brackets and converging downward, a lever pivoted intermediate its ends between said arms, a tire clamp connected for operation with said lever, said lever being angularly disposed to parallel one of said converging arms, and means for locking said lever to said arm to prevent the removal of a tire and rim from the holder.

15. A tire carrier comprising a ring on which a tire and rim are adapted to be carried and an auxiliary tire holder mounted on said ring, said auxiliary tire holder including spaced supporting brackets undercut to receive one edge of said ring, plates adapted to abut the opposite edge of said ring and means to connect said brackets to said plate members to secure said brackets to said ring.

16. In an auxiliary tire carrier a tire support comprising members adapted to engage opposite edges of a ring on which a tire and rim are adapted to be mounted, the members being drawn together in clamping engagement with the ring by means of a tension member positioned within the ring.

Signed at Los Angeles, California, this 22d day of September, 1916.

CHESTER E. STRIFLER.

Witnesses:
CHAS. J. CHUNN,
L. BELLE WEAVER.